(12) United States Patent
Rakshit

(10) Patent No.: US 12,541,180 B2
(45) Date of Patent: Feb. 3, 2026

(54) MOVEMENT SEQUENCE ANALYSIS UTILIZING PRINTED CIRCUITS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 807 days.

(21) Appl. No.: 17/012,177

(22) Filed: Sep. 4, 2020

(65) Prior Publication Data
US 2022/0075329 A1    Mar. 10, 2022

(51) Int. Cl.
| | |
|---|---|
| G05B 13/02 | (2006.01) |
| B29C 64/393 | (2017.01) |
| B33Y 50/02 | (2015.01) |
| B33Y 80/00 | (2015.01) |
| C12M 3/00 | (2006.01) |
| G06N 5/04 | (2023.01) |

(52) U.S. Cl.
CPC ........ *G05B 13/0265* (2013.01); *B29C 64/393* (2017.08); *B33Y 50/02* (2014.12); *B33Y 80/00* (2014.12); *C12M 21/08* (2013.01); *G06N 5/04* (2013.01)

(58) Field of Classification Search
CPC .... G05B 13/0265; B33Y 50/02; B33Y 80/00; C12M 21/08; C12M 33/00; G06N 5/04; G06N 20/00; B29C 64/393
See application file for complete search history.

(56) References Cited

U.S. PATENT DOCUMENTS

| | | |
|---|---|---|
| 10,245,355 B2 | 4/2019 | Ingber |
| 10,603,190 B2 | 3/2020 | Mateus Dias Quinaz |
| 10,653,316 B2 | 5/2020 | Varadan |
| 10,717,191 B2 | 7/2020 | Ponulak |

(Continued)

FOREIGN PATENT DOCUMENTS

| | | |
|---|---|---|
| AU | 2021337778 A1 | 5/2025 |
| CN | 108422421 A | 8/2018 |

(Continued)

OTHER PUBLICATIONS

Agarwala et al., "A novel 3D bioprinted flexible and biocompatible hydrogel bioelectronic platform", Elsevier, Biosensors and Bioelectronics 102 (2018), Available online Nov. 16, 2017, pp. 365-371, <https://doi.org/10.1016/j.bios.2017.11.039>.

(Continued)

*Primary Examiner* — Thomas C Lee
*Assistant Examiner* — Michael V Farina
(74) *Attorney, Agent, or Firm* — CHIP LAW GROUP

(57) ABSTRACT

A tool for movement sequence analysis utilizing printed circuits. The tool determines a workflow sequence based, at least in part, on one or more printed circuits within a printed organic component. The tool activates the workflow sequence utilizing applied external stimuli on the one or more printed circuits. Responsive to activating the workflow sequence, the tool analyzes a signal response from the one or more printed circuits. The tool generates one or more printing recommendations based, at least in part, on the signal response analysis.

20 Claims, 5 Drawing Sheets

(56) References Cited

U.S. PATENT DOCUMENTS

| | | | |
|---|---|---|---|
| 2003/0209064 A1* | 11/2003 | Adamson | B60C 23/0411 |
| | | | 73/146 |
| 2008/0037808 A1* | 2/2008 | Sawada | B06B 1/0622 |
| | | | 29/25.35 |
| 2008/0097712 A1 | 4/2008 | Bruce et al. | |
| 2009/0192533 A1 | 7/2009 | Dlugos, Jr. et al. | |
| 2015/0250934 A1 | 9/2015 | Min | |
| 2017/0086683 A1 | 3/2017 | Bailey et al. | |
| 2017/0360578 A1 | 12/2017 | Shin et al. | |
| 2018/0093015 A1 | 4/2018 | Murphy et al. | |
| 2018/0144070 A1 | 5/2018 | Golway et al. | |
| 2019/0026472 A1 | 1/2019 | Adam et al. | |
| 2019/0119626 A1 | 4/2019 | Ekser | |
| 2019/0366645 A1 | 12/2019 | Amela Conesa et al. | |
| 2020/0008299 A1 | 1/2020 | Tran et al. | |
| 2020/0200153 A1 | 6/2020 | Lima | |
| 2020/0254683 A1* | 8/2020 | Rumpf | B29C 64/209 |
| 2021/0071127 A1* | 3/2021 | Levy | C12N 5/0667 |
| 2021/0330864 A1* | 10/2021 | Gumennik | A61L 27/04 |

FOREIGN PATENT DOCUMENTS

| | | |
|---|---|---|
| CN | 108446442 A | 8/2018 |
| CN | 110914809 A | 3/2020 |
| CN | 116171171 A | 5/2023 |
| DE | 112021004635 B4 | 1/2025 |
| GB | 2615419 A | 8/2023 |
| KR | 10-2023-0043205 A | 3/2023 |
| WO | 2015053834 A2 | 4/2015 |
| WO | 2016036275 A1 | 3/2016 |
| WO | 2022048636 A1 | 3/2022 |

OTHER PUBLICATIONS

Chowdhury, Hasan, "Liver success holds promise of 3D organ printing", Mar. 5, 2018, 10 pages.

Knowlton et al., "Bioprinting for Neural Tissue Engineering", Trends in Neurosciences, Jan. 2018, vol. 41, No. 1, 17 pages, <https://doi.org/10.1016/j.tins.2017.11.001>.

Kratz et al., "Latest Trends in Biosensing for Microphysiological Organs-on-a-Chip and Body-on-a-Chip Systems", Biosensors 2019, 9(3), 110, Published: Sep. 19, 2019, 25 pages, <https://doi.org/10.3390/bios9030110>.

Little et al., "Printing the future: 3D bioprinters and their uses", Australian Academy of Science, retrieved from the Internet on Aug. 7, 2020, 14 pages, <https://www.science.org.au/curious/people-medicine/bioprinting>.

Molitch-Hou, Michael, "From 3D Printing Circuit Boards to Organs, Nano Dimension's CEO Discusses New Bioprinting Subsidiary", engineering.com, posted on Feb. 24, 2017, 9 pages, <https://www.engineering.com/3DPrinting/3DPrintingArticles/ArticleID/14380/From-3D-Printing-Circuit-Boards-to-Organs-Nano-Dimensions-CEO-Discusses-New-Bioprinting-Subsidiary.aspx>.

Ozbolat, Ibrahim T., "Bioprinting scale-up tissue and organ constructs for transplantation", CellPress, TIBTEC-1268; No. of pp. 6, Trends in Biotechnology xx (2015) 1-6, <http://dx.doi.org/10.1016/j.tibtech.2015.04.005>.

Response to UK Examination Report, Application No. GB2302989.5, Mailing Date: Jun. 23, 2023, 7 pages.

"Movement Sequence Analysis Utilizing Printed Circuits", Application No. PCT CN2021/116436, filed on Sep. 3, 2021, 34 pages.

Patent Cooperation Treaty PCT, International Searching Authority, Notification of Transmittal of the International Search Report and the Written Opinion of the International Searching Authority, or the Declaration, Date of mailing Dec. 1, 2021, International application No. PCT/CN2021/116436, Applicant's or agent's file reference PF210578PCT, International Filing Date: Sep. 3, 2021, 10 pages.

UK Examination Report, Application No. GB2302989.5, Mailing Date: May 2, 2023, 3 pages.

Intellectual Property Office, "Request for the Submission of an Opinion," May 27, 2025, 23 Pages, KR Application No. 10-2023-7007093.

Lind et al., "Instrumented cardiac microphysiological devices via multilateral three-dimensional printing", Nature Materials, vol. 16, Mar. 2017, pp. 303-309, www.nature.com/naturematerials.

Zhu et al., "3D printed deformable sensors", Applied Sciences and Engineering, Jun. 17, 2020, 10 pages.

Examination Report, Australian Patent Application No. 2021337778, National Phase of International Application No. PCT/CN2021/116436, Sep. 27, 2024, 26 pages.

German Translation of Office Action dated Jun. 19, 2024, File No. 11 2021 004 635.7, Applicant/Proprietor International Business Machines Corporation, 5 pages.

Notice of acceptance for patent application (Australian), Your reference P0055877AU, Application No. 2021337778 Applicant name International Business Machines Corporation, Oct. 10, 2024, 3 pages.

Australian Government, Examination report No. 1 for standard patent application, Application No. 2021337778, Filing Date: Sep. 3, 2021, Date of this report: Jan. 24, 2024, 6 pages.

Chang JS et al., "A Circuits and Systems Perspective of Organic/Printed Electronics: Review, Challenges, and Contemporary and Emerging Design Approaches", IEEE Journal on Emerging and Selected Topics in Circuits and Systems, Mar. 2017, 20 pages, doi: 10.1109/JETCAS.2017.2673863.

Intellectual Property India, "Examination Report", Dec. 2, 2025, 7 Pages, IN Application No. 202347014235.

\* cited by examiner

MOVEMENT SEQUENCE ANALYSIS UTILIZING PRINTED CIRCUITS

BACKGROUND OF THE INVENTION

The present invention relates generally to cognitive computing systems, and more particularly to machine learning for movement sequence analysis utilizing printed circuits within bioprinted organic components.

Bioprinting processes take cells from organic components and turn the cells into a printable biological ink. Layers of cells are laid down in carefully calculated designs to build up small sections of tissue. Various organic components can be printed utilizing three-dimensional bioprinting methods, and can be successfully transplanted into a host.

SUMMARY

Aspects of an embodiment of the present invention disclose a method, a computer system and a computer program product for movement sequence analysis utilizing printed circuits. The method includes determining a workflow sequence based, at least in part, on one or more printed circuits within a printed organic component. The method further includes activating the workflow sequence utilizing applied external stimuli on the one or more printed circuits. Responsive to activating the workflow sequence, the method further includes analyzing a signal response from the one or more printed circuits. The method further includes generating one or more printing recommendations based, at least in part, on the signal response analysis.

DETAILED DESCRIPTION

Embodiments of the present invention recognize that after transplantation of an artificially created organic component, a researcher or medical professional could be interested in tracking the health status and compatibility of the artificially created organic component in a host. Embodiments of the present invention further recognize that consistent and continual monitoring of the process in real time is paramount to a successful implantation.

Embodiments of the present invention provide the capability to print multi-layer three-dimensional circuits amongst various layers of artificial cells of a printed organic component during the bioprinting process. Embodiments of the present invention further provide the capability to create a workflow sequence utilizing multi-layer printed circuits that can be leveraged to monitor performance and compatibility of a transplanted organic component in a patient.

The inventor has further observed and/or recognized that while printing any organic component utilizing a three-dimensional bioprinting method, self-powered printed circuits can be printed in various layers of artificial cells of a printed organic component, where the printed circuits, once implanted in a host, can generate power derived from movement of artificial and natural tissue, and generate signals for monitoring performance and compatibility metrics of the printed organic component.

The inventor has further observed and/or recognized that based on a type of organic component and a plurality of performance and compatibility metrics to be monitored, an intelligent combination of circuits can be printed in sequence within various layers of artificial cells of a printed organic component to gather the various performance and compatibility metrics for consistent and continual monitoring of the printed organic component.

The inventor has further observed and/or recognized that while printing an organic component with a three-dimensional bioprinting method, embodiments of the present invention provide the capability to identify expected natural movement in the printed organic component, and accordingly determine an optimal location within the printed organic component for a printed circuit to generate power from the natural movement.

The inventor has further observed and/or recognized that a printed circuit can include one or more piezoelectric chips to generate and supply electric power, based on natural movement of tissue, for sending signals to a paired mobile device for consistent and continual monitoring of the printed organic component.

Implementation of such embodiments may take a variety of forms, and exemplary implementation details are discussed subsequently with reference to the Figures.

Figure 1:
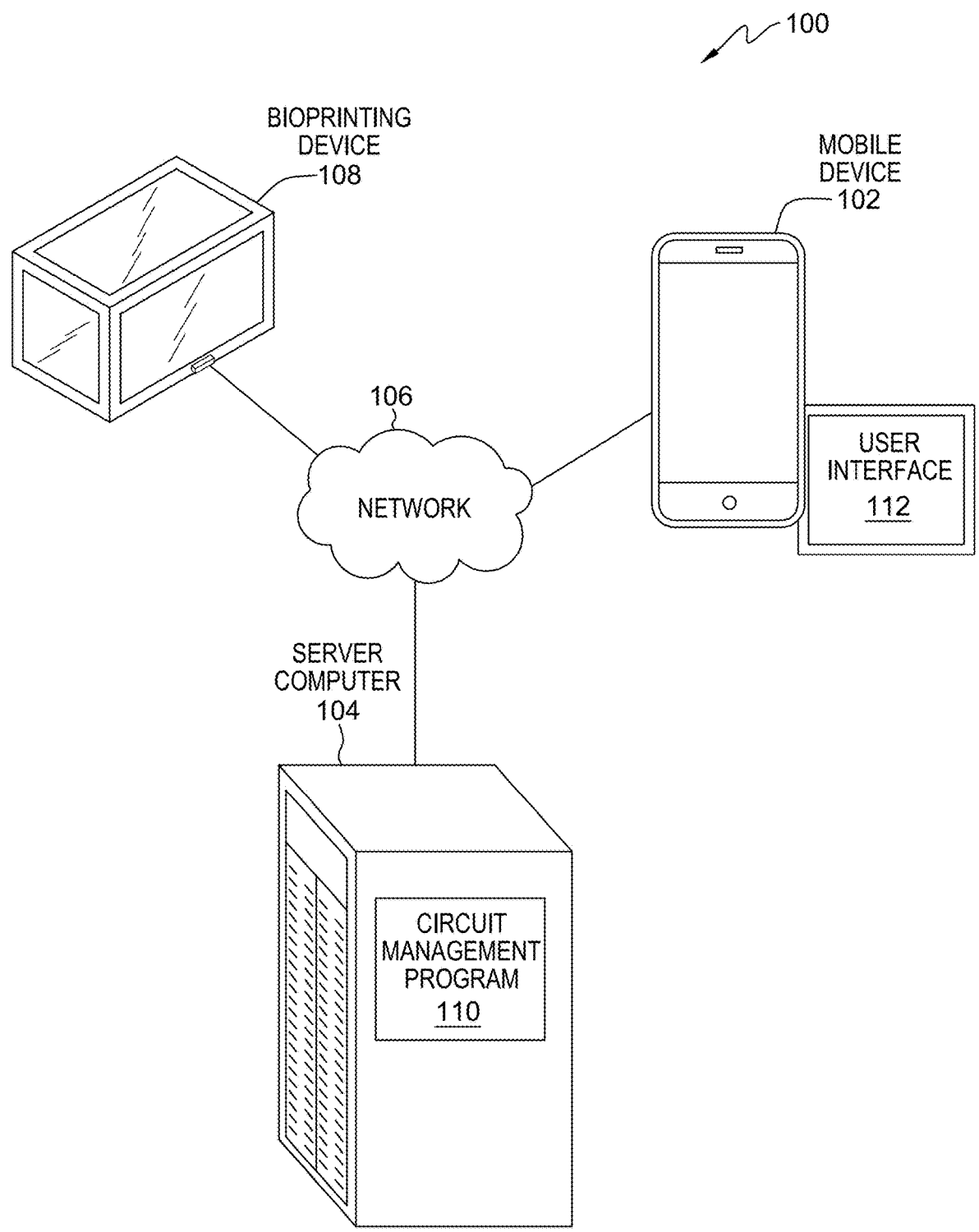
FIG. 1 is a functional block diagram illustrating a data processing environment suitable for operation of a circuit management program, in accordance with an embodiment of the present invention.

Referring now to various embodiments of the invention in more detail, FIG. 1 is a functional block diagram of a distributed data processing environment, generally designated 100, suitable for operation of a circuit management program in accordance with at least one embodiment of the invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes mobile device 102 and server computer 104, and bioprinting device 108, all interconnected over network 106. Network 106 can be, for example, a telecommunications network, a local area network (LAN), a wide area network (WAN), such as the Internet, or a combination of the three, and can include wired, wireless, or fiber optic connections. Network 106 may include one or more wired and/or wireless networks that are capable of receiving and transmitting data, voice, and/or video signals, including multimedia signals that include voice, data, and video information. In general, network 106 may be any combination of connections and protocols that will support communications between mobile device 102, server computer 104, and bioprinting device 108, as well as other computing devices (not shown) within distributed data processing environment 100. FIG. 1 is intended as an example and not as an architectural limitation for the different embodiments.

In one embodiment, mobile device 102 may be a laptop computer, tablet computer, smartphone, smartwatch, or any programmable electronic device capable of communicating with various components and devices within distributed data processing environment 100, via network 106. In general, mobile device 102 may represent any programmable electronic device or combination of programmable electronic devices capable of executing machine readable program instructions and communicating with other computing devices (not shown) within distributed data processing environment 100 via a network, such as network 106. More specifically, mobile device 102 represents any device capable of sending and receiving signals, monitoring data, and analyzing signal feedback. In another embodiment, mobile device 102 may represent a sensor, or a collection of connected sensors (i.e., paired smart watch, heart monitor and any other wearable electronic device, etc.), capable of sending and receiving signals, monitoring data, and analyzing signal feedback related to physical conditions of a patient. In another embodiment, mobile device 102 may be a tablet used by a physician to apply external stimuli to a printed circuit within a transplanted printed organic component and monitor various performance and compatibility metrics related to the transplanted printed organic component. In one embodiment, mobile device 102 is capable of communicating with server computer 104 and bioprinting device 108. In one embodiment, mobile device 102 includes user interface 112.

In one embodiment, user interface 112 provides an interface between a user of mobile device 102 and server computer 104. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 112 may also be mobile application software that provides an interface between a user of mobile device 102, bioprinting device 108, and server computer 104. Mobile application software, or an "app," is a computer program that runs on smartphones, tablet computers, smartwatches and any other mobile devices.

In one embodiment, server computer 104 can be a stand-alone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In an embodiment, server computer 104 represents a computing system utilizing clustered computers and components (e.g., database server computers, application server computers, etc.) that act as a single pool of seamless resources when accessed within distributed data processing environment 100. Server computer 104 includes circuit management program 110 communicatively coupled to server computer 104, and facilitates communication between circuit management program 110, mobile device 102, and bioprinting device 108. Server computer 104 may include internal and external hardware components, as depicted and described in further detail with respect to FIG. 5.

In one embodiment, circuit management program 110 operates on a central server, such as server computer 104 and may be utilized by one or more mobile devices, such as mobile device 102 and bioprinting device 108, via network 106. In another embodiment, circuit management program 110 may be a program downloaded from the central server or a third-party provider (not shown), and executed on a mobile device, such as mobile device 102, for managing printing of multi-layer circuits during three dimensional bioprinting methods and monitoring movement sequences of artificial cells in a transplanted printed organic component. In another embodiment, circuit management program 110 may be a program, downloaded from a central server, such as server computer 104 and installed on one or more mobile devices, such as mobile device 102. In yet another embodiment, circuit management program 110 may be utilized as a software service provided by a third-party cloud service provider (not shown). In yet another embodiment, circuit management program 110 may include one or more components, such as add-ons, plug-ins, and agent programs, etc., installed on one or more mobile devices, such as mobile device 102, to track movement sequences of artificial cells in a transplanted printed organic component to monitor performance and compatibility of the transplanted printed organic component in a patient.

In one embodiment, circuit management program 110 is a program for providing the capability to manage printing of multi-layered circuits in various layers of printed bio cells during three dimensional bioprinting methods, and further monitoring movement sequences of the printed bio cells in a transplanted organic component utilizing applied external stimuli on the printed multi-layered circuits. In one embodiment, circuit management program 110 provides the capability to print multi-layer three-dimensional circuits amongst various layers of artificial cells of a printed organic component during a bioprinting process. In one embodiment, circuit management program 110 provides the capability to create a workflow sequence utilizing a plurality of multi-layer printed circuits that can be leveraged to monitor performance and compatibility of a transplanted organic component in a patient. In one embodiment, circuit management program 110 provides the capability to manage self-powered printed circuits printed in various layers of artificial cells of a printed organic component, where the printed circuits, once implanted in a patient, can generate power derived from movement of artificial and natural tissue, and generate signals for monitoring performance and compatibility metrics of the printed organic component. In one embodiment, circuit management program 110 provides the capability to determine, based, at least in part, on a type of organic component, historical expected movement data, and a plurality of performance and compatibility metrics to be monitored, an intelligent combination of circuits to be printed in sequence within various layers of artificial cells of a printed organic component for gathering the plurality of performance and compatibility metrics for the printed organic component. In one embodiment, circuit management program 110 provides the capability to identify an expected natural movement in the printed organic component, and accordingly determine an optimal location within the printed organic component for a printed circuit to generate power from the natural movement. In one embodiment, circuit management program 110 provides the capability to apply external stimuli to a printed circuit, including one or more piezoelectric chips that generate and supply electric power to the printed circuit based on natural movement, to activate the printed circuit. In one embodiment, circuit management program 110 provides the capability to receive various signals from one or more printed circuits on a paired mobile device for consistent and continual monitoring of the printed organic component, and to further provide recommendations for printing circuits within a printed organic component.

In one embodiment, bioprinting device 108 is a three-dimensional (3D) bioprinting device interconnected with a server, such as server computer 104, via a network, such as network 106. In another embodiment, bioprinting device 108 is a smart device capable of pairing with a server computer, such as server computer 104, a mobile device, such as mobile device 102, and capable of communicating with a program on a server, such as circuit management program 110 on server computer 104. In one embodiment, bioprinting device 108 provides the capability to print one or more electronic circuits within one or more bio-printed organic components to gather actual tissue movement sequences used in tracking performance and compatibility of the one or more bio-printed organic components once transplanted in a patient. In one embodiment, bioprinting device 108 is capable of printing organic components, such as bone, skin, blood vessels, neurons, and internal organs utilizing a printable bio ink derived from cultured cells extracted from a patient (i.e., human or animal). In one embodiment, bioprinting device 108 is capable of printing the cells in a layered array using hydrogel as a support medium. In one embodiment, bioprinting device 108 is capable of receiving instructions from a server computer, such as server computer 104, a mobile device, such as mobile device 102, and a circuit management program, such as circuit management program 110, to print multi-layer electronic circuits within the cells of an organic component being printed using a three-dimensional bioprinting method. In one embodiment, bioprinting device 108 is capable of receiving instructions from a server computer, such as server computer 104, a mobile device, such as mobile device 102, and a circuit management program, such as circuit management program 110, to print any number of electronic circuits in any number of specific locations within various layers of a printed organic component. In one embodiment, bioprinting device 108 includes multiple printing heads to print electronic circuits, bio ink, etc., and an integrated robotic mechanism to assemble the circuits, including sensors, piezoelectric chip, and additional parts of the electronic circuit.

Figure 2:
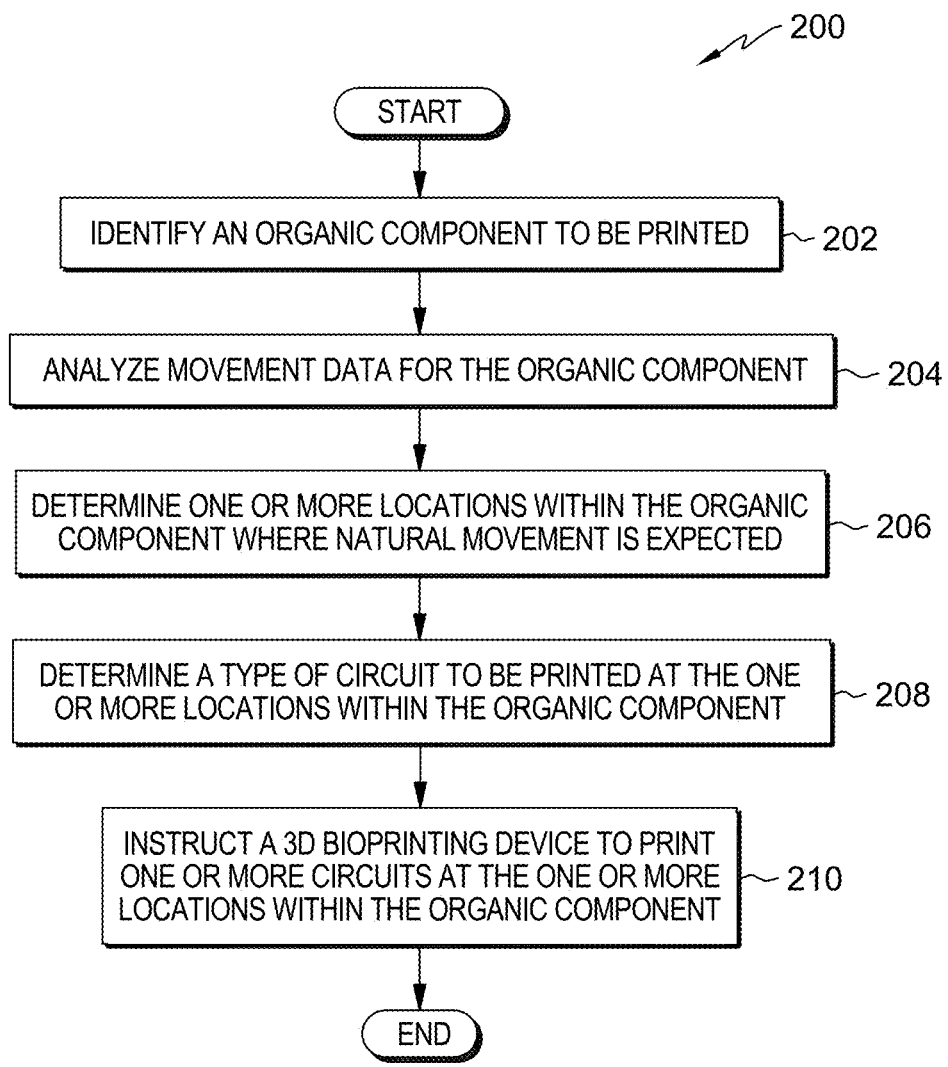
FIG. 2 is a flowchart depicting operational steps of a circuit management program, in accordance with an embodiment of the present invention.

FIG. 2 depicts a flowchart of operational steps of a circuit management program, such as circuit management program 110 of FIG. 1, generally designated 200, for creating a workflow sequence utilizing multi-layer printed circuits, in accordance with an embodiment of the present invention.

Circuit management program 110 identifies an organic component to be printed (202). In one embodiment, circuit management program 110 identifies an organic component to be printed by utilizing an artificial intelligence (AI) system, and direct user input, to determine the organic component to be printed. For example, when a doctor inputs data, such as patient information, a proposed surgical procedure, etc., into circuit management program 110 via user interface 112 of mobile device 102, circuit management program 110 utilizes the AI system to identify the organic component to be printed based, at least in part, on the inputted data and historical data associated with similar inputted data. In one embodiment, circuit management program 110 may utilize the AI system to query, for example, a proposed surgical procedure, such as a leg transplant in an amputee patient, to determine a left leg is to be printed. In this example, circuit management program 110 may further utilize the AI system to determine a size, shape, color, etc., of the left leg.

Circuit management program 110 analyzes movement data for the organic component (204). In one embodiment, circuit management program 110 analyzes movement data for the organic component to be printed by gathering the movement data for the organic component from a knowledge corpus. In one embodiment, circuit management program 110 accesses the knowledge corpus by querying the AI system for the historical data relating to a movement pattern for the organic component to be printed, such as natural (i.e., expected) range of motion for a healthy and functioning example of the organic component to be printed, how the muscular system and skeletal system of the healthy and functioning example organic component actuates the movement pattern, etc. In one embodiment, circuit management program 110 utilizes the historical data regarding the movement pattern for the healthy and functioning example of the organic component to be printed to identify a location, position, and orientation of the organic component that is comparatively static (i.e., identify locations within the organic component where there is not movement exhibited), and further identify one or more specific locations of the organic component exhibiting maximum movement relative to comparatively static locations based, at least in part, on the natural movement pattern of the organic component, and associated structures and systems.

Circuit management program 110 determines one or more locations within the organic component where natural movement is expected (206). In one embodiment, circuit management program 110 determines one or more locations within the organic component to be printed where natural movement is expected by analyzing various image data for an example of the organic component to be printed. In one embodiment, circuit management program 110 extracts the various image data from the knowledge corpus relating to a natural movement pattern of the example organic component, and further determines one or more specific locations of the organic component to be printed expected to exhibit maximum movement based, at least in part, on the natural movement pattern of the example organic component, associated structures and systems, scan reports, and images, etc. In one embodiment, circuit management program 110 determines whether the one or more specific locations are suitable locations for printing one or more electronic circuits based, at least in part, on whether the one or more specific locations are expected to exhibit movement. Where the one or more specific locations are capable of natural movement sufficient for one or more printed electronic circuits to capture actual movement of tissue, associated structures, and systems of the organic component once transplanted into a patient, circuit management program determines the one or more specific locations as suitable locations. Where the one or more specific locations are not capable of natural movement sufficient for one or more printed electronic circuits to capture actual movement of tissue, associated structures, and systems of the organic component once transplanted into a patient, circuit management program determines the one or more specific locations are not suitable locations. In one embodiment, circuit management program 110 determines one or more specific locations within the organic component to be printed, where the one or more specific locations are suitable locations where natural movement is sufficient to enable a piezoelectric chip placed at the one or more specific locations to sufficiently generate power to supply one or more interconnected electronic circuits throughout the organic component to be printed, either located at the one or more specific locations, or at other comparatively static locations within the organic component. In one embodiment, circuit management program 110 determines one or more locations within the organic component to be printed based, at least in part, on areas within the organic component that are expected to exhibit the greatest movement comparatively to other areas of the organic component. In one embodiment, circuit management program 110 is able to determine the one or more specific locations in a plurality of layers throughout the organic component to be printed. For example, where a first layer of the organic component to be printed is not expected to exhibit natural movement of tissue detectable by an electronic circuit, circuit management program 110 is able to determine the one or more specific locations at second layer above the first layer, a third layer above the second layer, etc.

Circuit management program 110 determines a type of circuit to be printed at the one or more locations within the organic component (208). In one embodiment, circuit management program 110 determines a type of circuit to be printed at the one or more locations within the organic component based, at least in part, on the expected natural movement at the one or more locations within the organic component and desired tracking and performance characteristics desired for monitoring vital parameters, performance metrics, and compatibility of the organic component with a patient. For example, circuit management program 110 can utilize an AI system to identify desired parameters for tracking and monitoring patient progress, as well as what parameters to capture, and based, at least in part, on these parameters, determine a type of circuit to be printed at the one or more locations within the organic component. In one embodiment, circuit management program 110 can determine a type of circuit to be printed as an electronic circuit utilizing edible circuit material, such that the circuit will deteriorate and be absorbed by the patient after a period of time. In one embodiment, circuit management program 110 can determine a type of circuit to be printed as an electronic circuit utilizing various different sensors to measure performance and compatibility metrics, such as pressure, temperature, stress, movement (e.g., velocity, momentum, acceleration), or any other suitable parameters pertinent to tracking and monitoring performance of the organic component to be printed post implantation. In one embodiment, circuit management program 110 can determine a type of circuit to be printed as an electronic circuit capable of being identified uniquely, such that a mobile device, such as mobile device 102 can accurately monitor output from each individual electronic circuit printed within the organic component. In one embodiment, circuit management program 110 can determine a type of circuit to be printed as an electronic circuit interconnected with one or more additional electronic circuits and at least one piezoelectric chip placed within the electronic circuit. For example, circuit management program 110 is capable of determining an electronic circuit coupled with a piezoelectric chip, where the piezoelectric chip will supply power to the electronic circuit by converting physical movement of the organic component into electricity. In one embodiment, circuit management program 110 can determine a type of circuit to be printed as an electronic circuit utilizing a protective capsule to guard the printed electronic circuit. In one embodiment, circuit management program 110 can determine a type of circuit to be printed as an electronic circuit utilizing varying thicknesses based, at least in part, on a position, orientation, and particular location within the various layers of the printed organic component. In one embodiment, circuit management program 110 can determine a type of circuit to be printed as an electronic circuit utilizing an elastic material, such that the electronic circuit can remain active during situations where excess movement could cause damage to the electronic circuit. In one embodiment, circuit management program 110 determines a type of circuit to be printed as an electronic circuit that is capable of generating self-power and supplying power to any interconnected circuits within the organic component. In one embodiment, circuit management program 110 can determine a type of circuit to be printed as an electronic circuit capable of monitoring and gathering performance and compatibility data within the organic component, and transmitting this data to a paired mobile device, such as mobile device 102.

Circuit management program 110 instructs a 3D bioprinting device to print one or more circuits at the one or more locations within the organic component (210). In one embodiment, circuit management program 110 instructs a 3D bioprinting device, such as bioprinting device 108, to print one or more electronic circuits at the one or more specific locations within the organic component. In one embodiment, circuit management program 110 is able to instruct a 3D bioprinting device, such as bioprinting device 108, to print one or more electronic circuits at the one or more specific locations within the organic component by sending instructions to the 3D bioprinting device via a paired mobile device, such as mobile device 102, over a network, such as network 106. In one embodiment, circuit management program 110 is able to send instructions that include the organic component, the one or more specific locations to print the one or more electronic circuits within the organic component, as well as the type of electronic circuits to print.

Figure 4:
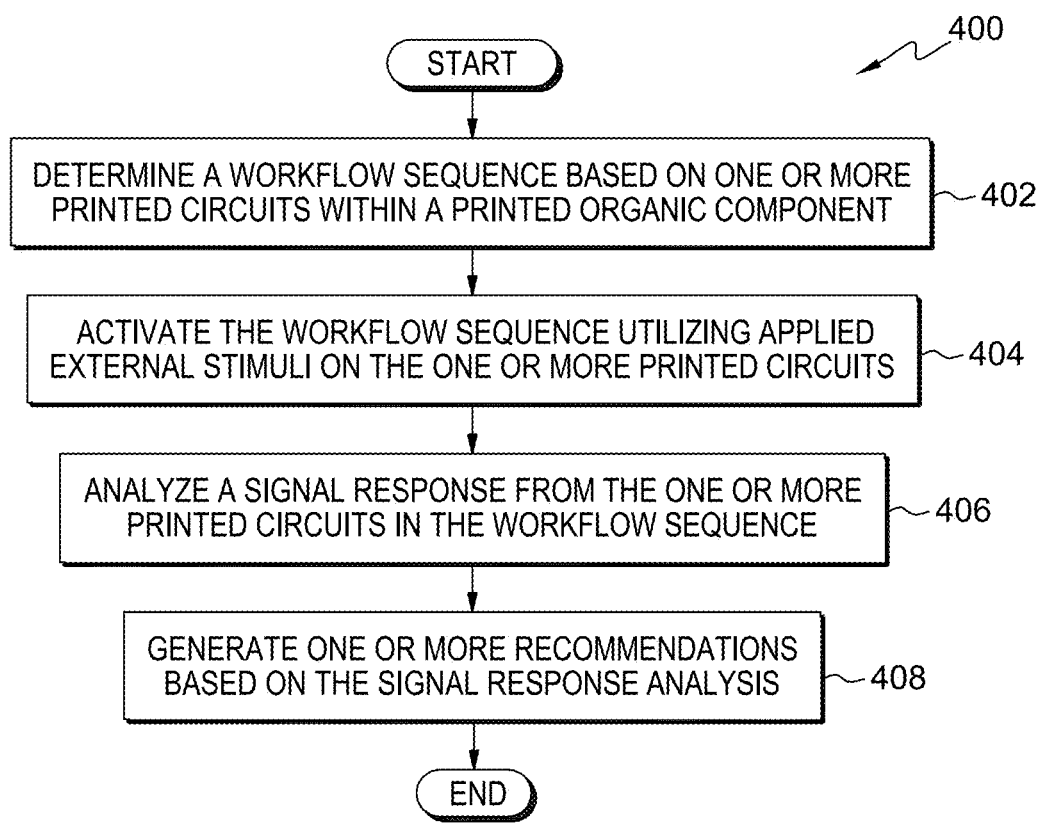
FIG. 4 is a flowchart depicting operational steps of a circuit management program, in accordance with an embodiment of the present invention.

Post implantation of the organic component, and subsequent movement sequence analysis are discussed in further detail with respect to FIG. 4.

Figure 3:
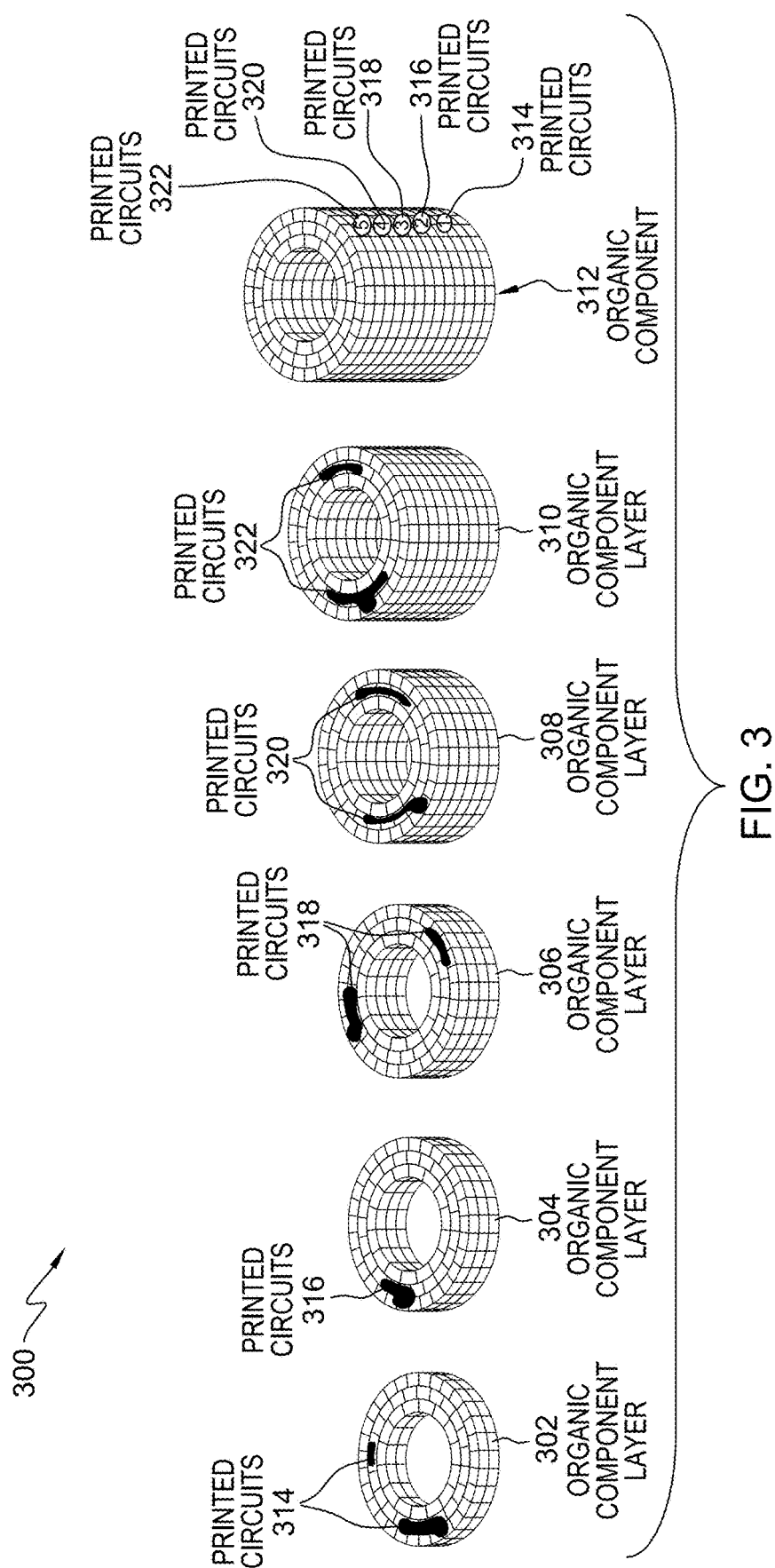
FIG. 3 is a configuration diagram illustrating a configuration of printed circuits within a bio-printed organic component, in accordance with an embodiment of the present invention.

FIG. 3 is a configuration diagram illustrating a configuration of printed circuits within a bio-printed organic component, generally designated 300, in accordance with an embodiment of the present invention.

Diagram 300 includes organic component layer 302, 304, 306, 308, and 310, which make up organic component 312. In one embodiment, organic component layer 302 is the lowest layer (first layer printed) of organic component 312, organic component layer 310 is the highest layer (last layer printed) of organic component 312, with organic component layer 304, 306, and 308 increasing in high sequentially from organic component layer 302 to organic component layer 310. Each organic component layer 302, 304, 306, 308, and 310 respectively include printed circuits 314, 316, 318, 320, and 322. Diagram 300 highlights how different types of printed circuits are able to be printed in different layers of a printed organic component, such as organic component 312, and one or more specific locations where natural movement is expected. Diagram 300 further highlights how an applied external stimuli to printed circuit 314, 316, 318, 320, and 322 is able to provide a signal response in a workflow sequence from organic component layer 302, which includes the first printed circuit 314 in the workflow sequence to, organic component layer 310, which includes the fifth printed circuit 322 in the workflow sequence, through intervening organic component layer 304, 306, and 308, and respective printed circuit 316, 318, and 320 of organic component 312.

FIG. 4 depicts a flowchart of operational steps of a circuit management program, such as circuit management program 110 of FIG. 1, generally designated 400, for performing movement sequence analysis of an implanted printed organic component, in accordance with an embodiment of the present invention.

Circuit management program 110 determines a workflow sequence based on one or more printed circuits within a printed organic component (402). In one embodiment, circuit management program 110 determines a workflow sequence based on one or more printed circuits within a printed organic component by assigning the one or more printed circuits according to a natural movement pattern expected from the printed organic component. For example, where the one or more printed circuits are printed within various different layers of the printed organic component, circuit management program 110 determines a workflow sequence (e.g., a tissue movement sequence) that links the one or more printed electronic circuits in a series such that each of the one or more electronic circuits is activated in a sequence simulating (i.e., mirroring) the natural movement sequence of tissue in the printed organic component. In one embodiment, circuit management program 110 determines the workflow sequence based on historical data and machine learning related to muscle movement and reflex arc signal flow and determines the workflow sequence of the one or more electronic circuits to accurately capture the expected natural movement of tissue in the printed organic component and expected reflex arc signal flow. In one embodiment, circuit management program 110 determines a workflow sequence by assigning a unique identifier to each of the one or more printed electronic circuits within the printed organic component, and further utilizes these identifiers to activate the one or more printed circuits in the workflow sequence that mimics the natural movement sequence expected from the printed organic component.

Circuit management program 110 activates the workflow sequence utilizing applied external stimuli on the one or more printed circuits (404). In one embodiment, circuit management program 110 activates the workflow sequence of the one or more printed electronic circuits by applying the external stimuli on the one or more printed circuits based on the unique identifiers assigned to each of the one or more printed electronic circuits. For example, where the one or more printed electronic circuits are identified by a unique identifier that orders each of the one or more printed electronic circuits in such a way as to accurately reflect the natural movement sequence expected from the printed organic component, circuit management program 110 activates the workflow sequence by applying an external stimuli to each of the one or more printed electronic circuits in their respective order with one another to mimic the natural movement sequence expected from the printed organic component. In one embodiment, the applied external stimuli can include electronic stimuli, external reflex stimuli, or any other suitable stimuli to activate the workflow sequence.

Circuit management program 110 analyzes a signal response from the one or more printed circuits in the workflow sequence (406). In one embodiment, circuit management program 110 analyzes the signal response from the one or more printed circuits in the workflow sequence by receiving one or more signals generated from the one or more printed electronic circuits in the workflow sequence, where a measurable level of strength of the one or more signals and actual observed movement of the printed organic component indicates a level of performance of the printed organic component, as well as a level of compatibility of the printed organic component with the patient. In one embodiment, circuit management program 110 can perform tissue movement sequence analysis based on the applied external stimuli, a measurable response time for the signal response, and an expected signal response time for each of the one or more printed electronic circuits, where the measurable signal response time (e.g., actual observed movement of the printed organic component, return of signal, etc.) relative to the applied external stimuli indicates a level of performance of the printed organic component, as well as a level of compatibility of the printed organic component with the patient. For example, where an expected response time between a first circuit and a second circuit is 0.01 seconds, and an actual signal response time between the first circuit and the second circuit is 0.1, circuit management program 110 determines the signal response time indicates a low level of performance of the printed organic component. In one embodiment, circuit management program 110 is able to provide the signal response (i.e., the one or more signals and associated response data) to a paired mobile device, such as mobile device 102. In one embodiment, the paired mobile device, such as mobile device 102, is capable of tracking and monitoring a sequence of signals from the one or more printed electronic circuits within the printed organic component, and as such, the sequence of signals, and relative signal strengths from each of the one or more printed electronic circuits, can be further analyzed to identify how the tissue movement sequence is performing after implantation. In one embodiment, where an augmented reality device, such as mobile device 102, is utilized, circuit management program 110 can provide the signals and associated response data from each of the one or more printed electronic circuits within the printed organic component to the augmented reality device, and based on a comparison to original signals from the one or more printed electronic circuits, generate a visualization of a reflex action (i.e., movement sequence) workflow sequence for the printed organic component, from various parts of the printed organic component, to highlight similarities and differences between the printed organic component and a healthy and functioning example of the printed organic component. As referred to herein, all data retrieved, obtained, collected, transferred, or otherwise used, is done so under explicit user consent utilizing an opt in/opt out feature. In one embodiment, circuit management program 110, prior to any acquisition or use of data, prompts a user to provide explicit consent utilizing an opt in/opt out feature presented on a mobile device, such as mobile device 102. For example, a user undergoing an organic component transplant procedure, and in addition to any implied or otherwise consented patient-doctor relationship, circuit management program 110 secures explicit consent of the user for data usage by prompting the user on a mobile device, such as mobile device 102, to explicitly consent to retrieving, obtaining, collecting, transferring, and otherwise using data related to the procedure utilizing an opt in feature. In one embodiment, circuit management program 110 is able to send a notification (e.g., an alert), to a mobile device of a user, such as mobile device 102, when data that has been explicitly consented to utilizing an opt in feature is being retrieved, obtained, collected, transferred, or otherwise used by circuit management program 110.

Circuit management program 110 generates one or more recommendations based on the signal response analysis (408). In one embodiment, circuit management program 110 generates one or more recommendations based on the signal response analysis by utilizing an AI system to distinguish between functioning neurons and muscles, and those that are faulty. In one embodiment, circuit management program 110 is able to identify a faulty circuit, a neuron damage, or muscle damage, based on the signal response analysis, and accordingly generate a printing recommendation (e.g., suggestion) for how to reprint the one or more printed circuits in the printed organic component to correct the fault. For example, circuit management program 110 may generate a recommendation to change a type of circuit, change the one or more specific locations to print the one or more electronic circuits, change the number of the one or more electronic circuits, etc., such that over a period of time progress can be tracked and corrective action taken. In one embodiment, circuit management program 110 is able to send the one or more recommendations to a 3D bioprinting device, such as bioprinting device 108, to utilize the one or more recommendations during reprinting of the one or more electronic circuits.

Figure 5:
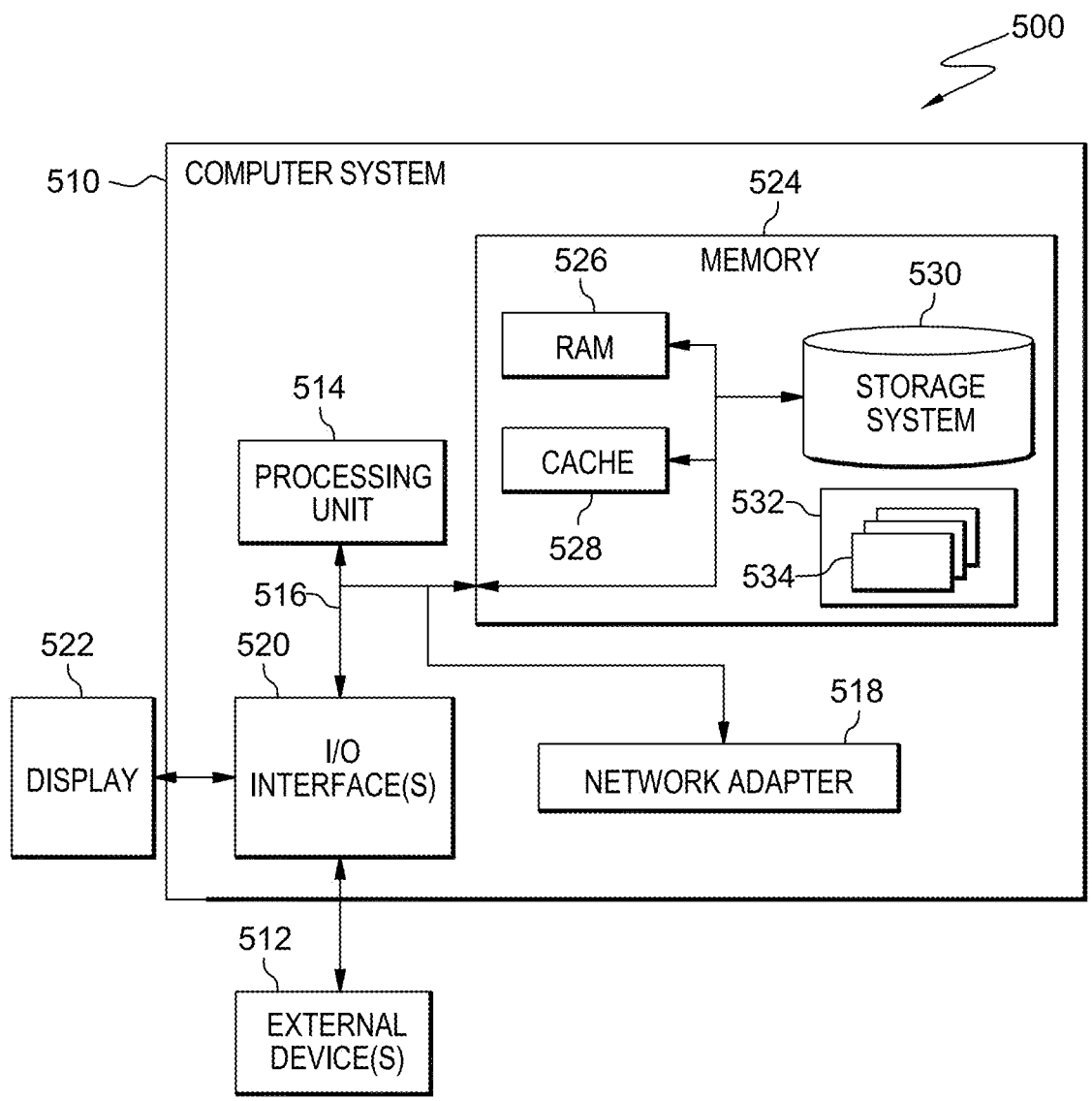
FIG. 5 is a block diagram depicting components of a data processing system (e.g., server computer of FIG. 1), in accordance with an embodiment of the present invention.

FIG. 5 depicts a block diagram of components of data processing system, such as server computer 104 of FIG. 1, generally designated 500, in accordance with an illustrative embodiment of the present invention. It should be appreciated that FIG. 5 provides only an illustration of one implementation and does not imply any limitations with regard to the environments in that different embodiments may be implemented. Many modifications to the depicted environment may be made.

In the illustrative embodiment, server computer 104 in distributed data processing environment 100 is shown in the form of a general-purpose computing device, such as computer system 510. The components of computer system 510 may include, but are not limited to, one or more processors or processing unit(s) 514, memory 524 and bus 516 that couples various system components including memory 524 to processing unit(s) 514.

Bus 516 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 510 typically includes a variety of computer system readable media. Such media may be any available media that is accessible by computer system 510 and it includes both volatile and non-volatile media, removable and non-removable media.

Memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 516 by one or more data media interfaces. As will be further depicted and described below, memory 524 may include at least one computer program product having a set (e.g., at least one) of program modules that are configured to carry out the functions of embodiments of the invention.

Program/utility 532, having one or more sets of program modules 534, may be stored in memory 524 by way of example and not limitation, as well as an operating system, one or more application programs, other program modules and program data. Each of the operating systems, one or more application programs, other program modules and program data or some combination thereof, may include an implementation of a networking environment. Program modules 534 generally carry out the functions and/or methodologies of embodiments of the invention as described herein. Computer system 510 may also communicate with one or more external device(s) 512, such as a keyboard, a pointing device, a display 522, etc. or one or more devices that enable a user to interact with computer system 510 and any devices (e.g., network card, modem, etc.) that enable computer system 510 to communicate with one or more other computing devices. Such communication can occur via Input/Output (I/O) interface(s) 520. Still yet, computer system 510 can communicate with one or more networks, such as a local area network (LAN), a general wide area network (WAN) and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives and data archival storage systems may be used in conjunction with computer system 510.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method comprising:
   printing, using a three-dimensional (3D) bioprinting device, an organic component and printing, using the 3D bioprinting device, one or more circuits, the one or more printed circuits being multi-layered three-dimensional circuits amongst layers of artificial cells of the printed organic component;
   determining, by one or more computer processors, a tissue movement sequence based, at least in part, on the one or more printed circuits within the printed organic component;
   activating, by the one or more computer processors and after an implantation of the printed organic component in a patient, the tissue movement sequence utilizing applied external stimuli to the one or more printed circuits in series such that each of the one or more printed circuits is activated in a sequence simulating a natural movement sequence of tissue in the printed organic component;

responsive to activating the tissue movement sequence, analyzing, by the one or more computer processors, a signal response from the one or more printed circuits;

generating, by the one or more computer processors and by utilizing an artificial intelligence system to distinguish between (i) one or more printed circuits, neurons and muscles that are functioning and (ii) at least one or more printed circuits, neurons, and muscles that are faulty, one or more printing recommendations based, at least in part, on the signal response analysis, wherein the generating the one or more printing recommendations includes identifying a fault in a circuit included in the one or more printed circuits; and reprinting, based on the one or more printing recommendations and using the 3D bioprinting device, the one or more printed circuits so that the identified fault in the circuit is corrected.

2. The method of claim 1, wherein the tissue movement sequence is a movement sequence that links the one or more printed circuits in a series based, at least in part, on a unique identifier for each of the one or more printed circuits, such that each of the one or more printed circuits activated in the tissue movement sequence simulate a natural movement pattern expected from the printed organic component.

3. The method of claim 1, wherein determining the tissue movement sequence further comprises:

determining, by the one or more computer processors, the tissue movement sequence based, at least in part, on historical data related to muscle movement and reflex are signal flow.

4. The method of claim 1, further comprising:

assigning, by the one or more computer processors, a unique identifier to each of the one or more printed circuits according to a natural movement pattern expected from the printed organic component.

5. The method of claim 1, wherein analyzing the signal response further comprises:

receiving, by the one or more computer processors, the signal response from the one of more printed circuits, wherein the signal response includes one or more signals generated from each of the one or more printed circuits in the tissue movement sequence, wherein a measurable level of strength of the one or more signals and an observed movement of the printed organic component indicates a level of performance for the printed organic component and a level of compatibility of the printed organic component with the patient after the implementation of the printed organic component in the patient.

6. The method of claim 1, wherein analyzing the signal response further comprises:

performing, by the one or more computer processors, a movement sequence analysis based, at least in part, on the applied external stimuli, a measurable response time for the signal response, and an expected signal response time for each of the one or more printed circuits, wherein the measurable signal response time relative to the expected signal response time after the applied external stimuli indicates a level of performance for the printed organic component and a level of compatibility of the printed organic component with the patient after the implementation of the printed organic component in the patient.

7. The method of claim 1, further comprising:

generating, by the one or more computer processors, a visualization of a reflex action for the printed organic component on an augmented reality device based, at least in part, a movement sequence analysis, wherein the visualization includes similarities and differences between the printed organic component and a healthy example of the printed organic component.

8. The method of claim 1, wherein the generating the one or more printing recommendations further comprises:

generating, by the one or more computer processors and by utilizing the artificial intelligence system, a recommendation to change a specific location of a printed circuit included in the one or more printed circuits based, at least in part, on the signal response analysis, wherein the reprinting the one or more printed circuits includes reprinting the printed circuit at the changed specific location so that a fault in the printed circuit is corrected.

9. A computer program product comprising:

one or more computer readable storage media; and program instructions stored on the one or more computer readable storage media, for causing one or more processors to perform the following computer operations:

print, using a three-dimensional (3D) bioprinting device, an organic component, and print, using the 3D bioprinting device, one or more circuits, the one or more printed circuits being multi-layered three-dimensional circuits amongst layers of artificial cells of the printed organic component;

determine a tissue movement sequence based, at least in part, on the one or more printed circuits within the printed organic component;

activate, after an implantation of the printed organic component in a patient, the tissue movement sequence utilizing applied external stimuli on the one or more printed circuits in series such that each of the one or more printed circuits is activated in a sequence simulating a natural movement sequence of tissue in the printed organic component;

responsive to activating the tissue movement sequence, analyze a signal response from the one or more printed circuits;

generate, using an artificial intelligence system to distinguish between (i) one or more printed circuits, neurons and muscles that are functioning and (ii) at least one or more printed circuits, neurons, and muscles that are faulty, one or more printing recommendations based, at least in part, on the signal response analysis, wherein the generating the one or more printing recommendations includes identifying a fault in a circuit included in the one or more printed circuits; and reprint, based on the generated one or more printing recommendations and using the 3D bioprinting device, the one or more printed circuits so that the identified fault in the circuit is corrected.

10. The computer program product of claim 9, wherein the tissue movement sequence is a movement sequence that links the one or more printed circuits in a series based, at least in part, on a unique identifier for each of the one or more printed circuits, such that each of the one or more printed circuits activated in the tissue movement sequence simulate a natural movement pattern expected from the printed organic component.

11. The computer program product of claim 9, wherein the determine the tissue movement sequence further comprises:

determine the tissue movement sequence based, at least in part, on historical data related to muscle movement and reflex are signal flow.

12. The computer program product of claim 9, wherein the stored program instructions are for causing the one or more processors to perform the following additional computer operation:
    assign a unique identifier to each of the one or more printed circuits according to a natural movement pattern expected from the printed organic component.

13. The computer program product of claim 9, wherein the analyze the signal response further comprises:
    receive the signal response from the one or more printed circuits, wherein the signal response includes one or more signals generated from each of the one or more printed circuits in the tissue movement sequence, wherein a measurable level of strength of the one or more signals and an observed movement of the printed organic component indicates a level of performance for the printed organic component and a level of compatibility of the printed organic component with the patient after the implantation of the printed organic component in the patient.

14. The computer program product of claim 9, wherein the analyze the signal response further comprises:
    forming a movement sequence analysis based, at least in part, on the applied external stimuli, a measurable response time for the signal response, and an expected signal response time for each of the one or more printed circuits, wherein the measurable signal response time relative to the expected signal response time after the applied external stimuli indicates a level of performance for the printed organic component and a level of compatibility of the printed organic component with the patient after the implementation of the printed organic component in the patient.

15. The computer program product of claim 9, wherein the stored program instructions are for causing the one or more processors to perform the following additional commuter operation:
    generate a visualization of a reflex action for the printed organic component on an augmented reality device based, at least in part, a movement sequence analysis, wherein the visualization includes similarities and differences between the printed organic component and a healthy example of the printed organic component.

16. A computer system comprising:
    one or more computer processors;
    one or more computer readable storage media; and
    program instructions stored on at least one of the one or more computer readable storage media for causing the one or more computer processors to perform the following computer operations:
        print, using a three-dimensional (3D) bioprinting device, an organic component, and print, using the 3D bioprinting device, one or more circuits, the one or more printed circuits being multi-layered three-dimensional circuits amongst layers of artificial cells of the printed organic component;
        determine a tissue movement sequence based, at least in part, on the one or more printed circuits within the printed organic component;
        activate the tissue movement sequence utilizing applied external stimuli on the one or more printed circuits in series such that each of the one or more printed circuits is activated in a sequence simulating a natural movement sequence of tissue in the printed organic component;
        responsive to activating the tissue movement sequence, analyze a signal response from the one or more printed circuits;
        generate, by using an artificial intelligence system to distinguish between (i) one or more printed circuits, neurons and muscles that are functioning and (ii) at least one or more printed circuits, neurons, and muscles that are faulty, one or more printing recommendations based, at least in part, on the signal response analysis, wherein the generating the one or more printing recommendations includes identifying a fault in a circuit included in the one or more printed circuits; and
        reprint, based on the generated one or more printing recommendations and using the 3D bioprinting device, the one or more printed circuits so that the identified fault in the circuit is corrected.

17. The computer system of claim 16, wherein the tissue movement sequence is a movement sequence that links the one or more printed circuits in a series based, at least in part, on a unique identifier for each of the one or more printed circuits. such that each of the one or more printed circuits activated in the tissue movement sequence simulate a natural movement pattern expected from the printed organic component.

18. The computer system of claim 16, wherein the stored program instructions are for causing the one or more processors to perform the following additional computer operation:
    assign a unique identifier to each of the one or more printed circuits according to a natural movement pattern expected from the printed organic component.

19. The computer system of claim 16, wherein the analyze the signal response further comprises:
    receive the signal response from the one or more printed circuits, wherein the signal response includes one or more signals generated from each of the one or more printed circuits in the tissue movement sequence, wherein a measurable level of strength of the one or more signals and an observed movement of the printed organic component indicates a level of performance for the printed organic component and a level of compatibility of the printed organic component with the patient after the implantation of the printed organic component in the patient.

20. The computer system of claim 16, wherein the analyze the signal response further comprises:
    perform a movement sequence analysis based, at least in part, on the applied external stimuli, a measurable response time for the signal response, and an expected signal response time for each of the one or more printed circuits, wherein the measurable signal response time relative to the expected signal response time after the applied external stimuli indicates a level of performance for the printed organic component and a level of compatibility of the printed organic component with the patient after the implantation of the printed organic component in the patient.

\* \* \* \* \*